(12) United States Patent
Tian et al.

(10) Patent No.: US 12,259,515 B1
(45) Date of Patent: Mar. 25, 2025

(54) SAND SHALE FORMATION PHYSICAL PROPERTY EVALUATION METHOD AND SYSTEM FOR PRECISE DEEP OIL AND GAS NAVIGATION

(71) Applicant: INSTITUTE OF GEOLOGY AND GEOPHYSICS, CHINESE ACADEMY OF SCIENCES, Beijing (CN)

(72) Inventors: Fei Tian, Beijing (CN); Wenhao Zheng, Beijing (CN); Qingyun Di, Beijing (CN); Yongyou Yang, Beijing (CN); Wenjing Cao, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/829,315

(22) Filed: Sep. 10, 2024

(30) Foreign Application Priority Data

Sep. 19, 2023 (CN) .......................... 202311205151.6

(51) Int. Cl.
  *G01V 3/20* (2006.01)
  *G01V 11/00* (2006.01)
(52) U.S. Cl.
  CPC .............. *G01V 3/20* (2013.01); *G01V 11/002* (2013.01)
(58) Field of Classification Search
  None
  See application file for complete search history.

(56) References Cited

U.S. PATENT DOCUMENTS

| 11,500,117 B1 | 11/2022 | Tian et al. |
| 2015/0073712 A1 | 3/2015 | Kherroubi et al. |

(Continued)

FOREIGN PATENT DOCUMENTS

| CN | 102590889 A | 7/2012 |
| CN | 104564041 A | 4/2015 |

(Continued)

OTHER PUBLICATIONS

Ahmed Farid Ibrahim, et al., Formation Resistivity Prediction Using Desicion Tree and Random Forest, Arabian Journal for Science and Engineering, 2022, pp. 12183-12191, vol. 47.

*Primary Examiner* — Lina Cordero
(74) *Attorney, Agent, or Firm* — Bayramoglu Law Offices LLC (57) ABSTRACT

A sand shale formation physical property evaluation method and system for precise deep oil and gas navigation aims to solve the problem that the prior art cannot acquire a real-time and accurate logging-while-drilling (LWD) Rt curve. The method includes: acquiring basic data of a target well location as well as basic data and an LWD resistivity (Rt) of an adjacent well; dividing the data into different groups; retaining data with a maximum correlation value with the LWD Rt in each group of data; eliminating outliers, and performing standardization; constructing a two-dimensional input feature map by taking the correlation value and standardized data as a weight; acquiring an LWD Rt prediction curve based on the two-dimensional input feature map; calculating a hydrocarbon parameter in a window based on the LWD Rt prediction curve; and locating an area with a high hydrocarbon potential based on the hydrocarbon parameter at each position.

5 Claims, 2 Drawing Sheets

(56) References Cited

U.S. PATENT DOCUMENTS

| | | | |
|---|---|---|---|
| 2021/0301655 A1* | 9/2021 | Ranganathan | E21B 41/00 |
| 2021/0373106 A1 | 12/2021 | Singer et al. | |
| 2022/0170366 A1 | 6/2022 | Ou et al. | |
| 2023/0074074 A1* | 3/2023 | Xia | E21B 44/00 |
| 2023/0083651 A1 | 3/2023 | Tian et al. | |
| 2024/0076977 A1* | 3/2024 | Ghamdi | G06F 30/27 |

FOREIGN PATENT DOCUMENTS

| | | |
|---|---|---|
| CN | 105401939 A | 3/2016 |
| CN | 106324689 A | 1/2017 |
| CN | 111144651 A | 5/2020 |
| CN | 113759425 A | 12/2021 |
| CN | 113803060 A | 12/2021 |
| CN | 115222019 A | 10/2022 |
| RU | 2745137 C1 | 3/2021 |
| WO | 2016041189 A1 | 3/2016 |

* cited by examiner

```
┌─────────────────────────────────────────────────────────────┐
│ Acquire basic data of a target well location as well as basic data and │
│  an LWD Rt of an adjacent well, and divide the basic data of the       │
│  target well location and the basic data of the adjacent well into     │
│ lithological group data, porosity group data, drilling group data, and │
│                       logging group data                               │
└─────────────────────────────────────────────────────────────┘
```
 S100

```
┌─────────────────────────────────────────────────────────────┐
│  Calculate a first correlation value between each type of the basic    │
│  data of the adjacent well and an LWD Rt curve of the adjacent well;   │
│ and retain data with a maximum first correlation value in each of the  │
│    lithological group data, the porosity group data, the drilling group│
│     data, and the logging group data, to acquire a lithological group  │
│       significant parameter, a porosity group significant parameter, a │
│    drilling group significant parameter, and a logging group significant│
│                              parameter                                 │
└─────────────────────────────────────────────────────────────┘
```
 S200

```
┌─────────────────────────────────────────────────────────────┐
│    Eliminate, through an isolated forest algorithm, outliers of the    │
│        lithological group significant parameter, the porosity group    │
│   significant parameter, the drilling group significant parameter, and │
│       the logging group significant parameter to acquire standardized  │
│                         significant parameters                         │
└─────────────────────────────────────────────────────────────┘
```
 S300

```
┌─────────────────────────────────────────────────────────────┐
│     Select, based on the standardized significant parameters, the     │
│   lithological group significant parameter for geological stratification│
│       to acquire a number of depth units between stratigraphic abrupt  │
│    positions, and acquire a two-dimensional input feature map based on │
│          the number of the depth units, the standardized significant   │
│                  parameters, and the first correlation value           │
└─────────────────────────────────────────────────────────────┘
```
 S400

```
┌─────────────────────────────────────────────────────────────┐
│  Acquire, based on the two-dimensional input feature map, an LWD       │
│    Rt prediction curve through a trained LWD Rt prediction model       │
└─────────────────────────────────────────────────────────────┘
```
 S500

```
┌─────────────────────────────────────────────────────────────┐
│   Construct sliding units based on the depth units; traverse an initial│
│  stratigraphic framework model through the sliding units; calculate a  │
│            hydrocarbon parameter in a window based on the LWD Rt       │
│        prediction curve; and locate an area with a high hydrocarbon    │
│          potential based on the oil hydrocarbon parameter at each position,│
│    thereby acquiring a formation physical property evaluation result   │
└─────────────────────────────────────────────────────────────┘
```
 S600

SAND SHALE FORMATION PHYSICAL PROPERTY EVALUATION METHOD AND SYSTEM FOR PRECISE DEEP OIL AND GAS NAVIGATION

CROSS REFERENCE TO THE RELATED APPLICATIONS

This application is based upon and claims priority to Chinese Patent Application No. 202311205151.6, filed on Sep. 19, 2023, the entire contents of which are incorporated herein by reference.

TECHNICAL FIELD

The present disclosure belongs to the field of geological exploration, and in particular relates to a sand shale formation physical property evaluation method and system for precise deep oil and gas navigation.

BACKGROUND

The logging-while-drilling (LWD) resistivity (Rt) curve is closely related to the physical properties of the formation. However, due to instrument deficiency or malfunction, the LWD Rt curve may be missing. For example, in the process of deep oil and gas navigation, the accuracy of the acquired hydrocarbon parameter is insufficient, resulting in the inability to accurately analyze the specific location of an area with a high hydrocarbon potential (Ahmed Farid Ibrahim; Ahmed Abdelaall; Salaheldin Elkatatny. *Formation Resistivity Prediction Using Decision Tree and Random Forest.*).

The formation Rt measured by LWD Rt logging refers to the resistance of rocks or strata to the passage of electrical current, which is influenced by factors such as water content, salinity, porosity, pore structure, and rock type in the formation. The particularity of Rt logging lies in the severe formation interference, which requires the construction of characteristic parameters based on the proportion of the most relevant logging curve characteristics. The porosity and saturation in the formation have a direct impact on the Rt. Formations with higher porosity may contain more water or fluids, resulting in lower Rt. On the contrary, formations with lower porosity may contain fewer fluids, resulting in higher Rt. Porosity and saturation in the formation can be estimated by measuring Rt, which is crucial for oil and gas exploration and reservoir evaluation. Formations with higher salinity and water content typically have lower Rt, while those with lower salinity and water content typically have higher Rt. Therefore, it is hard to achieve accurate estimation through prediction methods missing acoustic (AC) curves or photoelectric factors (PEFs). In view of this, the present disclosure proposes a calculation method for evaluating the physical property of a formation.

SUMMARY

The present disclosure aims to solve the above-mentioned problems in the prior art, namely, the prior art cannot acquire a real-time and accurate logging-while-drilling (LWD) resistivity (Rt) curve, resulting in insufficient accuracy in locating an area with a high hydrocarbon potential. For this purpose, the present disclosure provides a sand shale formation physical property evaluation method for precise deep oil and gas navigation, including:

S100: acquiring basic data of a target well location as well as basic data and an LWD Rt of an adjacent well, and dividing the basic data of the target well location and the basic data of the adjacent well into lithological group data, porosity group data, drilling group data, and logging group data, where the lithological group data includes: neutron logging (NEU), photoelectric factor (PEF), and gamma ray (GR); the porosity group data includes: acoustic (AC), compensated neutron log (CNL), and density (DEN); the drilling group data includes drilling rate, rotary speed, and bit pressure; and the logging data includes content of methane (C1), content of ethane (C2), mud density in all (MDIA), and formation pore pressure graduation (FPPG);

S200: calculating a first correlation value between each type of the basic data of the adjacent well and an LWD Rt curve of the adjacent well; and retaining data with a maximum first correlation value in each of the lithological group data, the porosity group data, the drilling group data, and the logging group data, to acquire a lithological group significant parameter, a porosity group significant parameter, a drilling group significant parameter, and a logging group significant parameter;

S300: eliminating, through an isolated forest algorithm, outliers of the lithological group significant parameter, the porosity group significant parameter, the drilling group significant parameter, and the logging group significant parameter to acquire standardized significant parameters;

S400: selecting, based on the standardized significant parameters, the lithological group significant parameter for geological stratification to acquire a number of depth units between stratigraphic abrupt positions, and acquiring a two-dimensional input feature map based on the number of the depth units, the standardized significant parameters, and the first correlation value;

S500: acquiring, based on the two-dimensional input feature map, an LWD Rt prediction curve through a trained LWD Rt prediction model; and S600: constructing sliding units based on the depth units; traversing an initial stratigraphic framework model through the sliding units; calculating a hydrocarbon parameter in a window based on the LWD Rt prediction curve; and locating an area with a high hydrocarbon potential based on the hydrocarbon parameter at each position, thereby acquiring a formation physical property evaluation result.

In some preferred implementations, the standardized significant parameters are specifically acquired as follows:

A10: defining the lithological group significant parameter, the porosity group significant parameter, the drilling group significant parameter, and the logging group significant parameter as to-be-processed data X; and randomly selecting $\varphi$ data points from the to-be-processed data X to form a to-be-processed data subset X' to be stored in a root node;

A20: randomly selecting a dimension q from the to-be-processed data X, and randomly generating a cutting point p in the dimension q, where the cutting point p satisfies $\min(x_{ij}, j=q, x_{ij} \in X') < p < \max(x_{ij}, j=q, x_{ij} \in X')$; j denotes a serial number of the data point; and $x_{ij}$ denotes a value of a j-th data point in an i-th class;

A30: generating a hyperplane based on the cutting point p to divide data in the dimension q into two subspaces, and storing a data point with a value less than p in the dimension q in a first leaf node and a data point with a value greater than or equal to p in a second leaf node;

A40: performing recursive processing according to the steps A20 and A30 until all leaf nodes each include only one data point or an isolated tree reaches a preset height;

A50: repeating the steps A20 to A40 until T isolated trees are generated, where the T isolated trees do not include an external node of a leaf node, or the T isolated trees include two leaf nodes {$T_l$, $T_r$} and one internal node test; the internal node test of the T isolated trees includes the dimension q and the cutting point p; and a point satisfying q<p belongs to $T_l$ while a point not satisfying q<p belongs to $T_r$;

A60: forming an isolated forest by the T isolated trees; letting each data point $x_i$ traverse each of the isolated trees; calculating a height $h(x_i)$ of the data point $x_i$ in each of the isolated trees, specifically, a number of edges that the data point $x_i$ passes through from the root node to the leaf node of the isolated tree; calculating an average height of the data point $x_i$ in the isolated forest; and normalizing the average heights of all the data points to acquire a normalized average height $\overline{h(x_i)}$ of the data points; and A70: calculating an outlier score S (x, φ) based on the normalized average height $\overline{h(x_i)}$ of the data points:

$$s(x, \varphi) = 2^{\frac{E(\overline{h(x_i)})}{\overline{c(\varphi)}}};$$

where, $\overline{c(\varphi)}$ denotes an average value of a path length of a binary tree constructed by the φ data points, and E (*) denotes an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

where, H(i) denotes a harmonic number, estimated by ln(i)+0.5772156649; and 0.5772156649 denotes a Euler constant; and eliminating, when the outlier score s (x, ( ) is less than a preset outlier threshold s, a corresponding data point to acquire the standardized significant parameters C={$c_1$, . . . , $c_\alpha$, . . . , $c_m$}, 1≤α≥m, and cα∈ C, where m denotes a number of data points with a standardized significant parameter.

In some preferred implementations, the calculating a first correlation value between each type of the basic data of the adjacent well and an LWD Rt curve of the adjacent well specifically includes:

calculating a Spearman correlation coefficient between each type of data and the LWD Rt curve of the adjacent well as the first correlation value $S_{im1}$:

$$S_{im1} = \frac{\sum(R_{datai} - \overline{R})(S_{datai} - \overline{S})}{\sqrt{\sum(R_{datai} - \overline{R})^2 (S_{datai} - \overline{S})^2}};$$

where, $R_{datai}$ denotes a rank of the LWD Rt; datai denotes a serial number; and $S_{datai}$ denotes a rank of a value of a parameter data point in any basic data.

In some preferred implementations, a method for acquiring the depth units includes:

setting 10 data points as one depth unit based on the lithological group data of the basic data of the target well location;

calculating an average value $\overline{x}_{lit}$ of the lithological group data of each depth unit:

$$\overline{x}_{lit} = \frac{x_{g1} + x_{g2} + \ldots + x_{g10}}{10};$$

where, g denotes a group number;

calculating a difference between the average values $\overline{x}_{lit}$ of the lithological group data of adjacent depth units:

$$d_u = \overline{x}_{lit(u+1)} - \overline{x}_{lit(u)};$$

setting, when $d_e > 10$, a lower depth unit of the corresponding adjacent depth units as a lithological abrupt position, and calculating a number $h_t$ of depth units between each two abrupt positions to represent a stratum thickness, where I denotes a serial number of the depth unit;

taking a product of the standardized significant parameter and the first correlation value as a weight parameter $Z_{cate} = S_{im1_{cate}} Y_{cate}$, where cate denotes a category; and constructing the two-dimensional input feature map $Z_j \times 4 \times h_t$ by taking the number $h_t$ of the depth units as a stride.

In some preferred implementations, the acquiring an LWD Rt prediction curve through a trained LWD Rt prediction model specifically includes:

forming the LWD Rt prediction model, including a t-channel image recognition network with 2t convolutional layers and 2t average pooling layers, where each channel includes a first convolutional layer, a first average pooling layer, a second convolutional layer, and a second average pooling layer that are sequentially connected; each convolutional layer has a different size; an f-th channel includes a (4×f−1)×(4×f−1) first convolutional layer, a (4×f+4)×(4×f+4) second convolutional layer, and 2×2 pooling layers; and all the channels are connected together to one fully connected layer and one naive Bayesian decision maker;

denoting the first convolutional layer of a first channel, the first convolutional layer of a second channel, and the first convolutional layer of a third channel as C1, C3, and C5 layers, respectively, where the C1 layer is configured to convolve an input image through 8 $h_t \times h_t$ convolution kernels; the C3 layer is configured to convolve an input image through 8 $3h_t \times 3h_t$ convolution kernels; and the C5 layer is configured to convolve an input image through 8 $5h_t \times 5h_t$ convolution kernels;

$$con_{p,q}^l = \sum_{m1=1}^{L} \sum_{m2=1}^{W} CON_{m1,m2}^{l-1} \times ker_{p,q}^l + b_{p,q}^l;$$

where, $con_{p,q}^l$ denotes a convolution result at a position (p, q); l denotes a current layer number; CON denotes a matrix covered by the convolution kernels; L and W denote a length and a width of the matrix covered by the convolution kernels, respectively; m1 and m2 respectively denote a serial number of a length and a serial number of a width of the convolution kernel, ranging from 1 to L; ker denotes a kernel function; and b denotes a corresponding bias term;

fitting the convolution result through a rectified linear unit (ReLU) function to acquire a fitted convolution result;

performing upsampling pooling on the fitted convolution result:

$$con_{m3, m4}{}^{l}=\max(CON_{m1, m2}{}^{l-1});$$

where, $con_{m3, m4}{}^{l}$ denotes a two-dimensional matrix representation of a pooled convolution result; and m3, m4 denote a convolution result at a position (m3, m4);

converting the pooled convolution result into a tiled one-dimensional feature vector through a tiling layer;

integrating the tiled one-dimensional feature vector through the fully connected layer:

$$con_{key}^{l} = \sum_{r=1}^{R} con_{r}^{key-1} \cdot w_{r}^{l} + b_{r}^{l};$$

where, $CON_{key}{}^{l}$ denotes a one-dimensional matrix representation of a feature after the integration through the fully connected layer; l denotes the current layer number; key denotes an index value of a one-dimensional matrix; R denotes a length of a feature vector in an (l−1)-th layer; w denotes a weight matrix; b denotes the bias term; and r denotes a serial number of a data point of the feature vector;

introducing the naive Bayesian decision maker into the fully connected layer; and taking the integrated tiled one-dimensional feature vector as the LWD Rt prediction curve.

In some preferred implementations, the step S600 specifically includes:

constructing the sliding units based on the number $h_t$ of the depth units between the stratigraphic abrupt positions;

calculating average values of the LWD Rt prediction curve, the DEN, and the GR within the sliding unit in real time:

$$\overline{Rt_{pre}} = \frac{\sum_{k=1}^{N} Rt_{pre_k}}{N};$$

$$\overline{DEN} = \frac{\sum_{k=1}^{N} DEN_k}{N};$$

$$\overline{GR} = \frac{\sum_{k=1}^{N} GR_k}{N};$$

calculating a sandstone hydrocarbon parameter P in a current sliding unit:

$$P = \frac{\overline{Rt_{pre}} * \overline{DEN}}{\overline{GR}};$$

and determining a position of a sliding window where the sandstone hydrocarbon parameter P is greater than a set sandstone hydrocarbon parameter threshold P1 as a sandstone member with a high hydrocarbon potential.

Another aspect of the present disclosure proposes a sand shale formation physical property evaluation system for precise deep oil and gas navigation, including:

a data acquisition module, configured to acquire basic data of a target well location as well as basic data and an LWD Rt of an adjacent well, and divide the basic data of the target well location and the basic data of the adjacent well into lithological group data, porosity group data, drilling group data, and logging group data, where the lithological group data includes: NEU, PEF, and GR; the porosity group data includes: AC, CNL, and DEN; the drilling group data includes drilling rate, rotary speed, and bit pressure; and the logging data includes C1, C2, MDIA, and FPPG;

a significant parameter acquisition module, configured to calculate a first correlation value between each type of the basic data of the adjacent well and an LWD Rt curve thereof; and retain data with a maximum first correlation value in each of the lithological group data, the porosity group data, the drilling group data, and the logging group data, to acquire a lithological group significant parameter, a porosity group significant parameter, a drilling group significant parameter, and a logging group significant parameter;

an outlier elimination module, configured to eliminate, through an isolated forest algorithm, outliers of the lithological group significant parameter, the porosity group significant parameter, the drilling group significant parameter, and the logging group significant parameter to acquire standardized significant parameters;

a two-dimensional input feature map acquisition module, configured to select, based on the standardized significant parameters, the lithological group significant parameter for geological stratification to acquire a number of depth units between stratigraphic abrupt positions, and acquire a two-dimensional input feature map based on the number of the depth units, the standardized significant parameters, and the first correlation value;

an LWD Rt prediction module, configured to acquire, based on the two-dimensional input feature map, an LWD Rt prediction curve through a trained LWD Rt prediction model; and a high hydrocarbon potential area navigation module, configured to construct sliding units based on the depth units; traverse an initial stratigraphic framework model through the sliding units; calculate a hydrocarbon parameter in a window based on the LWD Rt prediction curve; and locate an area with a high hydrocarbon potential based on the hydrocarbon parameter at each position, thereby acquiring a formation physical property evaluation result.

The present disclosure has the following beneficial effects:

(1) The present disclosure constructs the two-dimensional input feature map for predicting the missing LWD Rt curve by taking a product of the standardized significant parameter and the first correlation value as a weight parameter and the number $h_t$ of the depth units as a stride. The present disclosure improves the prediction accuracy of the LWD Rt curve. Compared to the method of directly analyzing the area with a high hydrocarbon potential, the present disclosure improves the accuracy of analysis.

BRIEF DESCRIPTION OF THE DRAWINGS

Other features, objectives and advantages of the present disclosure will become more apparent upon reading the detailed description of the non-restrictive embodiments with reference to the following drawings.

DETAILED DESCRIPTION OF THE EMBODIMENTS

The present disclosure will be further described in detail below with reference to the drawings and embodiments. It should be understood that the specific embodiments described herein are merely intended to explain the present disclosure, rather than to limit the present disclosure. It should also be noted that, for convenience of description, only the parts related to the present disclosure are shown in the drawings.

It should be noted that the embodiments in the present disclosure and features in the embodiments may be combined with each other in a non-conflicting situation. The present disclosure will be described in detail below with reference to the drawings and embodiments.

Figure 1:
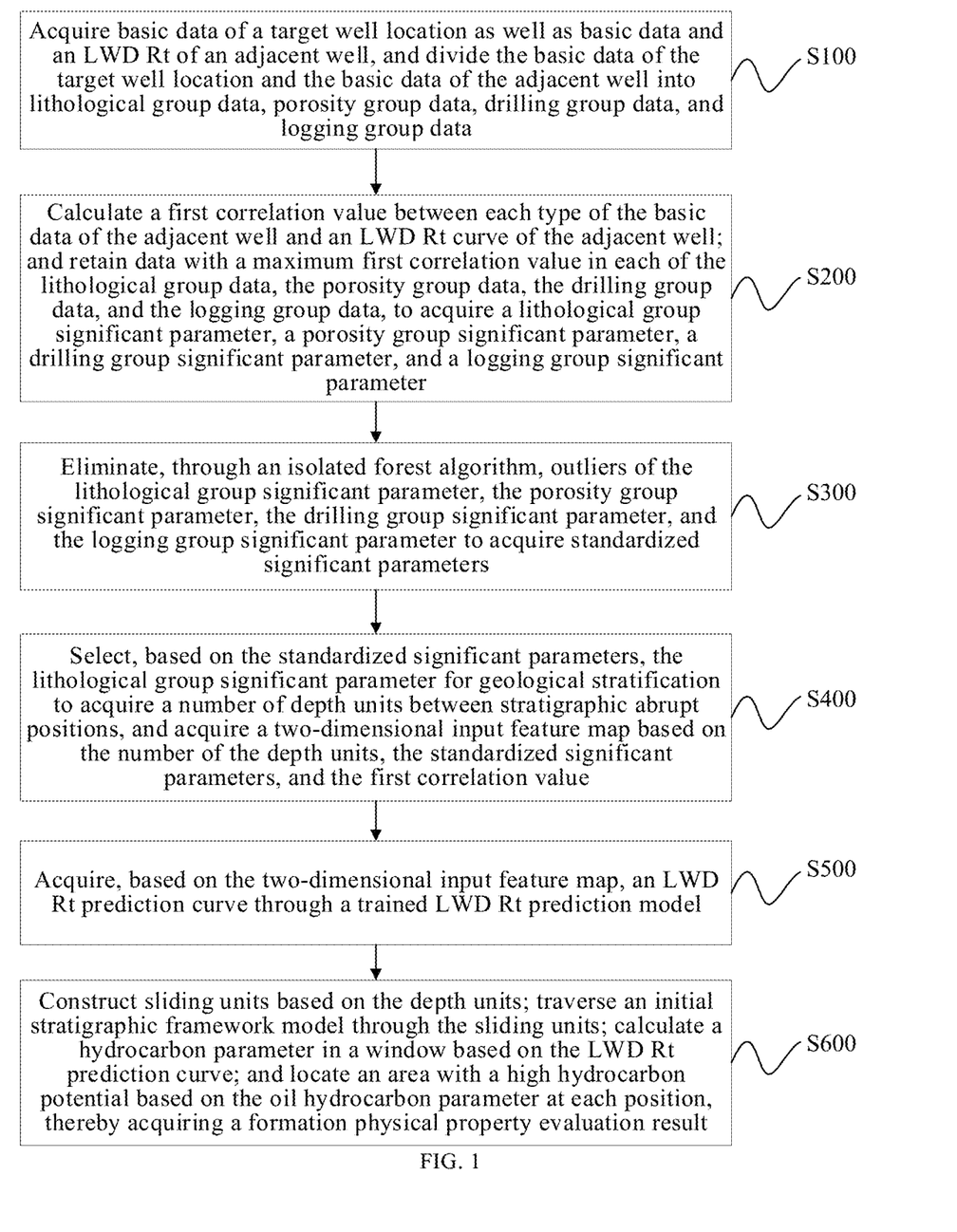
FIG. 1 is a flowchart of a sand shale formation physical property evaluation method for precise deep oil and gas navigation according to an embodiment of the present disclosure.

To more clearly explain a method of a sand shale formation physical property evaluation method for precise deep oil and gas navigation, steps in the embodiments of the present disclosure are described in detail below with reference to FIG. 1.

A first embodiment of the present disclosure provides a sand shale formation physical property evaluation method for precise deep oil and gas navigation. The method includes steps S100 to S600, which are described in detail as follows.

The LWD Rt measured by Rt logging refers to the resistance of rocks or strata to the passage of electrical current, which is influenced by factors such as water content, salinity, porosity, pore structure, and rock type in the formation. The particularity of Rt logging lies in the severe formation interference, which requires the construction of characteristic parameters based on the proportion of the most relevant logging curve characteristics. The porosity and saturation in the formation have a direct impact on the Rt. Formations with higher porosity may contain more water or fluids, resulting in lower Rt. On the contrary, formations with lower porosity may contain fewer fluids, resulting in higher Rt. By measuring Rt, porosity and saturation in the formation can be estimated, which is crucial for oil and gas exploration and reservoir evaluation. Formations with high salinity and high water content typically have lower Rt, while those with low salinity and low water content typically have higher Rt. Therefore, it is hard to achieve accurate estimation through prediction methods missing acoustic curves or photoelectric factors. In view of this, the present disclosure proposes a calculation method for evaluating the physical property of a formation.

In this embodiment, the basic data of the target well location is acquired with an interval of 0.1 m between the data points.

Due to the large amount of redundant information contained in the basic data, it is not convenient for further feature extraction. Therefore, it is necessary to conduct grouping and information fusion based on data types.

S100. Basic data of a target well location as well as basic data and an LWD Rt of an adjacent well are acquired, and the basic data of the target well location and the basic data of the adjacent well are divided into lithological group data, porosity group data, drilling group data, and logging group data. The lithological group data includes: neutron logging (NEU), photoelectric factor (PEF), and gamma ray (GR); the porosity group data includes: acoustic (AC), compensated neutron log (CNL), and density (DEN); the drilling group data includes drilling rate, rotary speed, and bit pressure; and the logging data includes C1, C2, MDIA, and FPPG.

S200. A first correlation value between each type of the basic data of the adjacent well and an LWD Rt curve of the adjacent well is calculated. Data with a maximum first correlation value in each of the lithological group data, the porosity group data, the drilling group data, and the logging group data is retained to acquire a lithological group significant parameter, a porosity group significant parameter, a drilling group significant parameter, and a logging group significant parameter. This step aims to retain the strongly correlated parameters with the LWD Rt curve, with one parameter retained for each group and a total of four parameters retained.

In this embodiment, the first correlation value between each type of the basic data of the adjacent well and the LWD Rt curve of the adjacent well is specifically calculated as follows.

A Spearman correlation coefficient between each type of data and the LWD Rt curve of the adjacent well is calculated as the first correlation value $S_{im1}$:

$$S_{im1} = \frac{\sum (R_{datai} - \overline{R})(S_{datai} - \overline{S})}{\sqrt{\sum (R_{datai} - \overline{R})^2 (S_{datai} - \overline{S})^2}};$$

where, $R_{datai}$ denotes a rank of the LWD Rt; datai denotes a serial number; and $S_{datai}$ denotes a rank of a value of a parameter data point in any basic data.

S300. Outliers of the lithological group significant parameter, the porosity group significant parameter, the drilling group significant parameter, and the logging group significant parameter are eliminated through an isolated forest algorithm to acquire standardized significant parameters.

In this embodiment, the standardized significant parameters are specifically acquired as follows.

A10. The lithological group significant parameter, the porosity group significant parameter, the drilling group significant parameter, and the logging group significant parameter are defined as to-be-processed data X. φ data points are randomly selected from the to-be-processed data X to form to-be-processed data subset X' to be stored in a root node.

A20. Dimension q is randomly selected from the to-be-processed data X, and cutting point p is randomly generated in the dimension q, where the cutting point p satisfies min $(x_{ij}, j=q, x_{ij} \in X') < p < \max (x_{ij}, j=q, x_{ij} \in X')$; j denotes a serial number of the data point; and $x_{ij}$ denotes a value of a j-th data point in an i-th class.

A30. A hyperplane is generated based on the cutting point p to divide data in the dimension q into two subspaces, and a data point with a value less than p in the dimension q is stored in a first leaf node while a data point with a value greater than or equal to p is stored in a second leaf node.

A40. Recursive processing is performed according to the steps A20 and A30 until all leaf nodes each include only one data point or an isolated tree reaches a preset height.

A50. The steps A20 to A40 are repeated until T isolated trees are generated, where the T isolated trees do not include an external node of a leaf node, or the T isolated trees include two leaf nodes $\{T_l, T_r\}$ and one internal node test;

the internal node test of the T isolated trees includes the dimension q and the cutting point p; and a point satisfying q<p belongs to Ty while a point not satisfying q<p belongs to $T_r$.

A60. An isolated forest is formed by the T isolated trees, and let each data point $x_i$ traverse each of the isolated trees. Height $h(x_i)$ of the data point $x_i$ in each of the isolated trees, specifically, a number of edges that the data point $x_i$ passes through from the root node to the leaf node of the isolated tree is calculated. An average height of the data point $x_i$ in the isolated forest is calculated, and the average heights of all the data points are normalized to acquire normalized average height $\overline{h(x_i)}$ of the data points.

A70. Outlier score S $(x, \varphi)$ is acquired based on the normalized average height $\overline{h(x_i)}$ of the data points:

$$s(x, \varphi) = 2^{\frac{E(\overline{h(x_i)})}{\overline{c(\varphi)}}};$$

where, $\overline{c(\varphi)}$ denotes an average value of a path length of a binary tree constructed by the $\varphi$ data points, and E(*) denotes an expectation.

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

where, H(i) denotes a harmonic number, estimated by ln(i)+0.5772156649; and 0.5772156649 denotes a Euler constant.

When the outlier score s $(x, \varphi)$ is less than preset outlier threshold s, a corresponding data point is eliminated to acquire the standardized significant parameters C={$c_1, \ldots, c_\alpha, \ldots, c_m$}, $1 \leq \alpha \leq m$, and $C_\alpha \in C$, where m denotes a number of data points with a standardized significant parameter. In this embodiment, when $s(x_i, \varphi)<s$, $x_i$ is eliminated. S is selected such that the number of remaining data points after elimination is approximately 95% of the number of data points before elimination. In this way, the standardized significant parameter is acquired after eliminating the outliers.

S400. Based on the standardized significant parameter, the lithological group significant parameter is selected for geological stratification to acquire a number of depth units between stratigraphic abrupt positions, and a two-dimensional input feature map is acquired based on the number of the depth units, the standardized significant parameters, and the first correlation value.

The impact of LWD Rt differs significantly across formations with varying lithologies. It is hard to acquire accurate results by using the same LWD Rt prediction method for all formations. Thus, specific LWD Rt prediction algorithms are needed for different formations. In sand shale formations, lithological parameters are highly sensitive to changes in lithology. Therefore, lithological parameters can be used to determine lithology and calculate the formation thickness.

In this embodiment, the depth units are generated as follows.

10 data points are set as one depth unit based on the lithological group data of the basic data of the target well location.

Average value $\overline{x}_{lit}$ of the lithological group data of each depth unit is calculated:

$$\overline{x}_{lit} = \frac{x_{g1} + x_{g2} + \ldots + x_{g10}}{10};$$

where, g denotes a group number.

A difference between the average values $\overline{x}_{lit}$ of the lithological group data of adjacent depth units is calculated:

$$d_u = \overline{x}_{lit(u+1)} - \overline{x}_{lit(u)};$$

When $d_e > 10$, a lower depth unit of the corresponding adjacent depth units is set as a lithological abrupt position, and number $h_t$ of depth units between each two abrupt positions is calculated to represent a stratum thickness, where u denotes a serial number of the depth unit.

A product of the standardized significant parameter and the first correlation value is taken as weight parameter $Z_{cate} = S_{im1_{cate}} Y_{cate}$, where cate denotes a category.

The two-dimensional input feature map $Z_j \times 4 \times h_t$ is constructed by taking the number $h_t$ of the depth units as stride.

S500. Based on the two-dimensional input feature map, an LWD Rt prediction curve is acquired through a trained LWD Rt prediction model.

In this embodiment, specifically, the LWD Rt prediction curve is acquired through the trained LWD Rt prediction model as follows.

The LWD Rt prediction model is formed, including a t-channel image recognition network with 2t convolutional layers and 2t average pooling layers, where each channel includes a first convolutional layer, a first average pooling layer, a second convolutional layer, and a second average pooling layer that are sequentially connected; each convolutional layer has a different size; an f-th channel includes a (4×f−1)×(4×f−1) first convolutional layer, a (4×f+4)×(4×f+4) second convolutional layer, and 2×2 pooling layers; and all the channels are connected together to one fully connected layer and one naive Bayesian decision maker.

Figure 2:
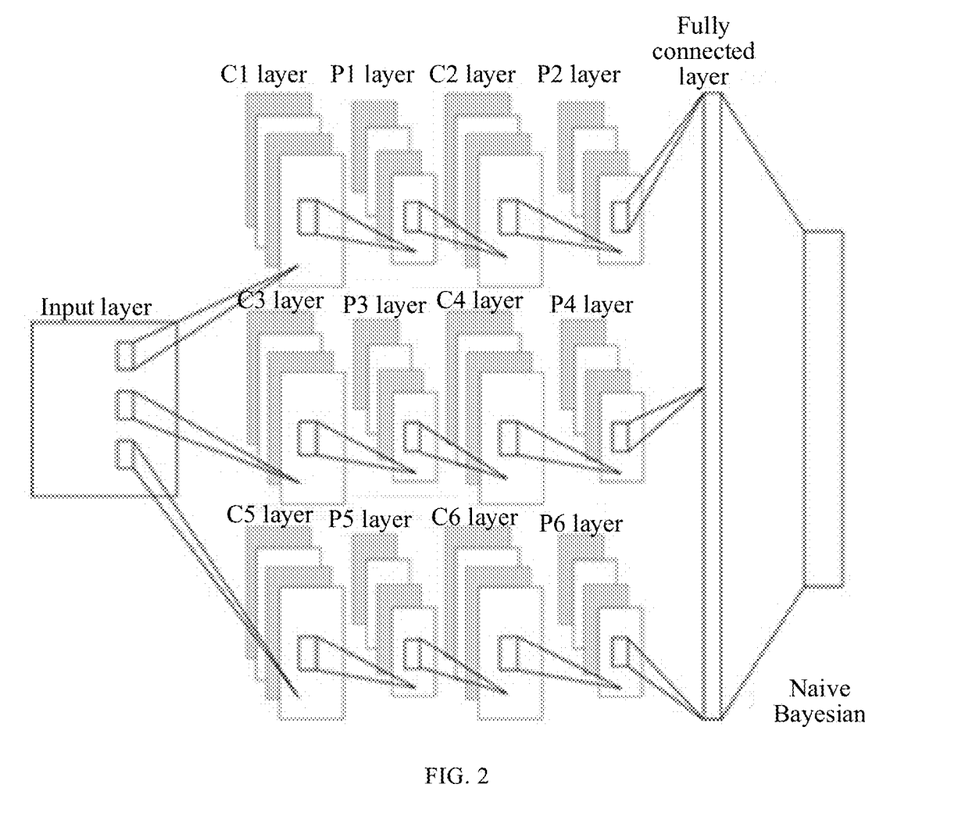
FIG. 2 is a structural diagram of an LWD Rt curve prediction model according to an embodiment of the present disclosure.

In this embodiment, the LWD Rt prediction model is shown in FIG. 2. A C1 layer convolves the input image through 8 3×3 convolution kernels to generate 8 190×190 feature maps. Pooling layer P1 pools the convolutional layer C1 in 2×2 units. The P1 layer includes 8 95×95 feature maps. P1 is convolved through 16 8×8 convolution kernels to acquire convolutional layer C2, which includes 16 88×88 feature maps. C2 is pooled in 2×2 units to generate pooling layer P2, which includes 16 44×44 feature maps.

The C3 layer convolves the input image through 8 7×7 convolution kernels to generate 8 186×186 feature maps. Pooling layer P3 pools the convolutional layer C3 in 2×2 units. The P3 layer includes 8 93×93 feature maps. P3 is convolved through 16 12×12 convolution kernels to generate convolutional layer C4, which includes 16 82×82 feature maps. C4 is pooled in 2×2 units to generate pooling layer P4, which includes 16 41×41 feature maps.

A C5 layer convolves the input image through 8 11×11 convolution kernels to generate 8 182×182 feature maps. The pooling layer P5 pools the convolutional layer C5 in 2×2 units. The P5 layer includes 8 91×91 feature maps. P5 is convolved through 16 16×16 convolution kernels to generate the convolutional layer C5, which includes 16 76×76 feature maps. C6 is pooled in 2×2 units to generate pooling layer P6, which includes 16 38×38 feature maps.

The first convolutional layer of a first channel, the first convolutional layer of a second channel, and the first convolutional layer of a third channel are denoted as C1, C3, and C5 layers, respectively, where the C1 layer is configured to convolve an input image through 8 $h_r \times h_t$ convolution kernels; the C3 layer is configured to convolve an input image through 8 $3h_r \times 3h_t$ convolution kernels; and the C5 layer is configured to convolve an input image through 8 $5h_r \times 5h_t$ convolution kernels.

$$con_{p,q}^l = \sum_{m1=1}^{L} \sum_{m2=1}^{W} CON_{m1,m2}^{l-1} \times ker_{p,q}^l + b_{p,q}^l;$$

where, $con_{p,q}^l$ denotes a convolution result at position (p, q); l denotes a current layer number; CON denotes a matrix covered by the convolution kernels; L and W denote a length and a width of the matrix covered by the convolution kernels, respectively; m1 and m2 respectively denote a serial number of a length and a serial number of a width of the convolution kernel, ranging from 1 to L; ker denotes a kernel function; and b denotes a corresponding bias term.

The convolution result is fitted through a ReLU function to acquire a fitted convolution result.

Upsampling pooling is performed on the fitted convolution result:

$$con_{m3, m4}^l = \max(CON_{m1, m2}^{l-1});$$

where, $con_{m3, m4}^l$ denotes a two-dimensional matrix representation of a pooled convolution result; and m3, m4 denote a convolution result at a position (m3, m4).

The pooled convolution result is converted into a tiled one-dimensional feature vector through a tiling layer.

The tiled one-dimensional feature vector is integrated through the fully connected layer:

$$con_{key}^l = \sum_{r=1}^{R} con_r^{key-1} \cdot w_r^l + b_r^l;$$

where, $con_{key}^l$ denotes a one-dimensional matrix representation of a feature after the integration through the fully connected layer; I denotes the current layer number; key denotes an index value of a one-dimensional matrix; R denotes a length of a feature vector in an (l–1)-th layer; w denotes a weight matrix; b denotes the bias term; and r denotes a serial number of a data point of the feature vector.

The naive Bayesian decision maker is introduced into the fully connected layer; and The integrated tiled one-dimensional feature vector is integrated as the LWD Rt prediction curve.

In this embodiment, the LWD Rt prediction model is further evaluated using two statistical performance indicators: mean absolute percentage error (MAPE) and root mean square error (RMSE). The purpose of MAPE and RMSE is to evaluate model performance by comparing an error between model output and prediction, with a smaller error value indicating better model performance. The MAPE and RMSE are calculated as follows.

$$MAPE = \frac{100}{N} \sum_{i=1}^{N} \left| \frac{y_m - y_p}{y_m} \right|;$$

$$RMSE = \sqrt{\frac{\sum_{i=1}^{N} (\bar{y}_p - y_m)^2}{N}};$$

where, N denotes a number of observations; $y_m$ denotes measured data; $y_p$ denotes predicted data; and $\bar{y}_p$ denotes an average of the predicted data, respectively.

S600. Sliding units are constructed based on the depth units. An initial stratigraphic framework model is traversed through the sliding units. A hydrocarbon parameter in a window is calculated based on the LWD Rt prediction curve. An area with a high hydrocarbon potential is calculated based on the hydrocarbon parameter at each position, thereby acquiring a formation physical property evaluation result.

In this embodiment, the step S600 is specifically as follows.

The sliding units are constructed based on the number $h_t$ of the depth units between the stratigraphic abrupt positions.

Average values of the LWD Rt prediction curve, the DEN, and the GR within the sliding unit in real time are calculated:

$$\overline{Rt}_{pre} = \frac{\sum_{k=1}^{N} Rt_{pre_k}}{N};$$

$$\overline{DEN} = \frac{\sum_{k=1}^{N} DEN_k}{N}; \text{ and}$$

$$\overline{GR} = \frac{\sum_{k=1}^{N} GR_k}{N}.$$

Sandstone hydrocarbon parameter P in a current sliding unit is calculated:

$$P = \frac{\overline{Rt}_{pre} * \overline{DEN}}{\overline{GR}};$$

A position of a sliding window where the sandstone hydrocarbon parameter P is greater than a set sandstone hydrocarbon parameter threshold P1 is determined as a sandstone member with a high hydrocarbon potential.

These steps are described in order in the above embodiments. However, those skilled in the art may understand that, in order to achieve the effects of these embodiments, different steps may not be necessarily executed in such an order, but may be executed simultaneously (in parallel) or in a reversed order. These simple changes should fall within the protection scope of the present disclosure.

A second embodiment of the present disclosure provides a sand shale formation physical property evaluation system for precise deep oil and gas navigation. Modules of the system are described as follows.

A data acquisition module is configured to acquire basic data of a target well location as well as basic data and an LWD Rt of an adjacent well, and divide the basic data of the target well location and the basic data of the adjacent well into lithological group data, porosity group data, drilling group data, and logging group data, where the lithological group data includes: NEU, PEF, and GR; the porosity group data includes: AC, CNL, and DEN; the drilling group data includes drilling rate, rotary speed, and bit pressure; and the logging data includes C1, C2, MDIA, and FPPG.

A significant parameter acquisition module is configured to calculate a first correlation value between each type of the basic data of the adjacent well and an LWD Rt curve of the adjacent well; and retain data with a maximum first correlation value in each of the lithological group data, the porosity group data, the drilling group data, and the logging group data, to acquire a lithological group significant parameter, a porosity group significant parameter, a drilling group significant parameter, and a logging group significant parameter.

An outlier elimination module is configured to eliminate, through an isolated forest algorithm, outliers of the lithological group significant parameter, the porosity group significant parameter, the drilling group significant parameter, and the logging group significant parameter to acquire standardized significant parameters.

A two-dimensional input feature map acquisition module is configured to select, based on the standardized significant parameters, the lithological group significant parameter for geological stratification to acquire a number of depth units between stratigraphic abrupt positions, and acquire a two-dimensional input feature map based on the number of the depth units, the standardized significant parameters, and the first correlation value.

A LWD Rt prediction module is configured to acquire, based on the two-dimensional input feature map, an LWD Rt prediction curve through a trained LWD Rt prediction model.

A high hydrocarbon potential area navigation module is configured to construct sliding units based on the depth units; traverse an initial stratigraphic framework model through the sliding units; calculate a hydrocarbon parameter in a window based on the LWD Rt prediction curve; and locate an area with a high hydrocarbon potential based on the hydrocarbon parameter at each position, thereby acquiring a formation physical property evaluation result.

Those skilled in the art should clearly understand that, for convenience and brevity of description, reference is made to corresponding processes in the above method embodiments for specific working processes and related description of the system, and details are not described herein again.

It should be noted that the sand shale formation physical property evaluation system for precise deep oil and gas navigation in the above embodiments is only described by taking the division of the above functional modules as an example. In practical applications, the above functions can be completed by different functional modules as required, that is, the modules or steps in the embodiments of the present disclosure are further decomposed or combined. For example, the modules in the above embodiments may be combined into one module, or may be further divided into a plurality of sub-modules to complete all or part of the functions described above. The names of the modules and steps involved in the embodiments of the present disclosure are only for distinguishing each module or step, and should not be regarded as improper limitations on the present disclosure.

Those skilled in the art should clearly understand that, for convenience and brevity of description, reference is made to corresponding processes in the above method embodiments for specific working processes and related description of the storage device and processing device, and details are not described herein again.

Those skilled in the art should be aware that the modules and method steps of the examples described in the embodiments disclosed herein may be implemented by electronic hardware, computer software or a combination thereof. The programs corresponding to software modules and method steps may be placed in random access memory (RAM), internal memory, read-only memory (ROM), electrically programmable ROM, electrically erasable programmable ROM, registers, hard disk, removable disk, compact disc read-only memory (CD-ROM), or in any other form of storage medium known in the technical field. In order to clearly illustrate the interchangeability of the electronic hardware and software, the composition and steps of each example are generally described in accordance with the function in the above description. Whether the functions are performed by electronic hardware or software depends on particular applications and design constraints of the technical solutions. Those skilled in the art may use different methods to implement the described functions for each specific application, but such implementation should not be considered to be beyond the scope of the present disclosure.

Terms such as "first" and "second" are intended to distinguish between similar objects, rather than describe or indicate a specific order or sequence.

Terms "include", "comprise" or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions of the present disclosure are described in the preferred implementations with reference to the drawings. Those skilled in the art should easily understand that the protection scope of the present disclosure is apparently not limited to these specific implementations. Those skilled in the art can make equivalent changes or substitutions to the relevant technical features without departing from the principles of the present disclosure, and the technical solutions derived by making these changes or substitutions should fall within the protection scope of the present disclosure.

What is claimed is:

1. A sand shale formation physical property evaluation method for deep oil and gas navigation comprising:
    S100: acquiring basic data of a target well location as well as basic data and a logging-while-drilling (LWD) resistivity (Rt) of an adjacent well, and dividing the basic data of the target well location and the basic data of the adjacent well into lithological group data, porosity group data, drilling group data, and logging group data, wherein the lithological group data comprises: neutron logging (NEU), photoelectric factor (PEF), and gamma ray (GR); the porosity group data comprises: acoustic (AC), compensated neutron log (CNL), and density (DEN); the drilling group data comprises drilling rate, rotary speed, and bit pressure; and the logging group data comprises content of methane (C1), content of ethane (C2), mud density in all (MDIA), and formation pore pressure graduation (FPPG);
    S200: calculating a first correlation value between each type of the basic data of the adjacent well and an LWD Rt curve of the adjacent well; and retaining data with a maximum first correlation value in each of the lithological group data, the porosity group data, the drilling group data, and the logging group data, to acquire a lithological group significant parameter, a porosity group significant parameter, a drilling group significant parameter, and a logging group significant parameter;
    S300: eliminating, through an isolated forest algorithm, outliers of the lithological group significant parameter, the porosity group significant parameter, the drilling group significant parameter, and the logging group significant parameter to acquire standardized significant parameters;

S400: selecting, based on the standardized significant parameters, the lithological group significant parameter for geological stratification to acquire a number of depth units between stratigraphic abrupt positions, and acquiring a two-dimensional input feature map based on the number of the depth units, the standardized significant parameters, and the first correlation value;

wherein, a method for acquiring the depth units comprises:

setting ten data points $(x_{g1}, x_{g2} \ldots x_{g10})$ as one depth unit based on the lithological group data of the basic data of the target well location;

calculating an average value $\bar{x}_{lit}$ of the lithological group data of each depth unit:

$$\bar{x}_{lit} = \frac{x_{g1} + x_{g2} + \ldots + x_{g10}}{10};$$

wherein, g denotes a group number;

calculating a difference $d_u$ between average values $\bar{x}_{lit}$ of the lithological group data of adjacent depth units:

$$d_u = \bar{x}_{lit(u+1)} - \bar{x}_{lit(u)};$$

setting, when $d_u > 10$, a lower depth unit of corresponding adjacent depth units as a lithological abrupt position, and calculating a number $h_t$ of depth units between each two abrupt positions to represent a stratum thickness, wherein u denotes a serial number of the depth unit;

taking a product of the standardized significant parameters and the first correlation value as a weight parameter $Z_{cate} = S_{im1cate} C_{cate}$, wherein cate denotes a category; and constructing the two-dimensional input feature map $Z_{cate} \times 4 \times h_t$ by taking the number $h_t$ of the depth units as a stride;

S500: acquiring, based on the two-dimensional input feature map, an LWD Rt prediction curve through a trained LWD Rt prediction model; and wherein acquiring the LWD Rt prediction curve through the trained LWD Rt prediction model comprises:

forming the LWD Rt prediction model, comprising a t-channel image recognition network with 2t convolutional layers and 2t average pooling layers, wherein each channel comprises a first convolutional layer, a first average pooling layer, a second convolutional layer, and a second average pooling layer that are sequentially connected; each convolutional layer has a different size; an f-th channel comprises a (4×f−1)×(4×f−1) first convolutional layer, a (4×f+4)×(4×f+4) second convolutional layer, and 2×2 pooling layers; and all channels are connected together to one fully connected layer and one naive Bayesian decision maker;

denoting the first convolutional layer of a first channel, the first convolutional layer of a second channel, and the first convolutional layer of a third channel as a C1 layer, a C3 layer, and a C5 layer, respectively, wherein the C1 layer is configured to convolve an input image through 8 $h_t \times h_t$ convolution kernels; the C3 layer is configured to convolve the input image through 8 $3h_t \times 3h_t$ convolution kernels; and the C5 layer is configured to convolve the input image through 8 $5h_t \times 5h_t$ convolution kernels;

$$con_{p,q}^{l} = \sum_{m1=1}^{L} \sum_{m2=1}^{W} CON_{m1,m2}^{l-1} \times ker_{p,q}^{l} + b_{p,q}^{l};$$

wherein, $con_{p,q}^{l}$ denotes a convolution result at a position (p, q); l denotes a current layer number; CON denotes a matrix covered by convolution kernels; L and W denote a length and a width of the matrix covered by the convolution kernels, respectively; m1 and m2 respectively denote a serial number of a length and a serial number of a width of the convolution kernels, ranging from 1 to L; ker denotes a kernel function; and b denotes a corresponding bias term;

fitting the convolution result through a rectified linear unit (ReLU) function to acquire a fitted convolution result;

performing upsampling pooling on the fitted convolution result:

$$con_{m3, m4}^{l} = \max(CON_{m1, m2}^{l-1});$$

wherein, $con_{m3, m4}^{l}$ denotes a two-dimensional matrix representation of a pooled convolution result; and m3, m4 denote a convolution result at a position (m3, m4);

converting the pooled convolution result into a tiled one-dimensional feature vector through a tiling layer;

integrating the tiled one-dimensional feature vector through the fully connected layer:

$$con_{key}^{l} = \sum_{r=1}^{R} con_{r}^{key-1} \cdot w_{r}^{l} + b_{r}^{l};$$

wherein, $con_{key}^{l}$ denotes a one-dimensional matrix representation of a feature after the integration through the fully connected layer; l denotes a current layer number; key denotes an index value of a one-dimensional matrix; R denotes a length of a feature vector in an (l−1)-th layer; w denotes a weight matrix; b denotes the corresponding bias term; and r denotes a serial number of a data point of the feature vector;

introducing the naive Bayesian decision maker into the fully connected layer; and taking the integrated tiled one-dimensional feature vector as the LWD Rt prediction curve; and S600: constructing sliding units based on the depth units; traversing an initial stratigraphic framework model through the sliding units; calculating a hydrocarbon parameter in a window based on the LWD Rt prediction curve; and locating an area with a hydrocarbon potential based on the hydrocarbon parameter at each position, thereby acquiring a formation physical property evaluation result.

2. The sand shale formation physical property evaluation method for deep oil and gas navigation according to claim 1, wherein the standardized significant parameters are acquired as follows:

A10: defining the lithological group significant parameter, the porosity group significant parameter, the drilling group significant parameter, and the logging group significant parameter as to-be-processed data X; and randomly selecting φ data points from the to-be-processed data X to form a to-be-processed data subset X' to be stored in a root node;

A20: randomly selecting a dimension q from the to-be-processed data X, and randomly generating a cutting point p in the dimension q, wherein the cutting point p satisfies $$\min(x_{ij}, j=q, x_{ij} \in X') < p < \max(x_{ij}, j=q, x_{ij} \in X'),$$

wherein j denotes a serial number of the data point; and $x_{ij}$ denotes a value of a j-th data point in an i-th class;

A30: generating a hyperplane based on the cutting point p to divide data in the dimension q into two subspaces, and storing a data point with a value less than p in the dimension q in a first leaf node and a data point with a value greater than or equal to p in a second leaf node;

A40: performing recursive processing according to A20 and A30 until all leaf nodes each comprise only one data point or an isolated tree reaches a preset height;

A50: repeating A20 to A40 until T isolated trees are generated, wherein the T isolated trees do not comprise an external node of a leaf node, or the T isolated trees comprise two leaf nodes $\{T_l, T_r\}$ and one internal node test; the internal node test of the T isolated trees comprises the dimension q and the cutting point p; and a point satisfying q<p belongs to $T_l$ while a point not satisfying q<p belongs to $T_r$;

A60: forming an isolated forest by the T isolated trees; letting each data point $x_i$ traverse each of the T isolated trees; calculating a height $h(x_i)$ of the data point $x_i$ in each of the T isolated trees, specifically, a number of edges that the data point $x_i$ passes through from the root node to the leaf node of the isolated tree; calculating an average height of the data point $x_i$ in the isolated forest; and normalizing average heights of the φ data points to acquire a normalized average height $\overline{h(x_i)}$ of the φ data points; and A70: calculating an outlier score s(x, φ) based on the normalized average height $\overline{h(x_i)}$ of the φ data points:

$$s(x, \varphi) = 2^{\frac{E(\overline{h(x_i)})}{c(\varphi)}};$$

wherein, $\overline{c(\varphi)}$ denotes an average value of a path length of a binary tree constructed by the φ data points, and E(*) denotes an expectation;

$$\overline{c(\varphi)} = \begin{cases} 2H(\varphi-1) - \frac{2(\varphi-1)}{\varphi}, & \varphi > 2 \\ 1, & \varphi = 2 \\ 0, & \varphi < 2 \end{cases};$$

wherein, H(i) denotes a harmonic number, estimated by ln(i)+0.5772156649; and 0.5772156649 denotes a Euler constant; and eliminating, when the outlier score s(x, φ) is less than a preset outlier threshold s, a corresponding data point to acquire the standardized significant parameters C={$c_1, \ldots, c_\alpha, \ldots, c_m$}, 1<α<m, and $c\alpha \in C$, wherein m denotes a number of data points with a standardized significant parameter.

3. The sand shale formation physical property evaluation method for deep oil and gas navigation according to claim 1, wherein calculating the first correlation value between each type of the basic data of the adjacent well and the LWD Rt curve of the adjacent well comprises:

calculating a Spearman correlation coefficient between each type of base data of the adjacent well and the LWD Rt curve of the adjacent well as the first correlation value $S_{im1}$:

$$S_{im1} = \frac{\sum_{i=1}^{n}(C_i - \overline{C})(Y_i - \overline{Y})}{\sqrt{\sum_{i=1}^{n}(C_i - \overline{C})^2}\sqrt{\sum_{i=1}^{n}(Y_i - \overline{Y})^2}}$$

wherein, i denotes a serial number.

4. The sand shale formation physical property evaluation method for deep oil and gas navigation according to claim 1, wherein S600 comprises:

constructing the sliding units based on the number $h_t$ of the depth units between the stratigraphic abrupt positions;

calculating an average value $\overline{Rt_{pre}}$ of the LWD Rt prediction curve, an average value $\overline{DEN}$ of the DEN, and an average value $\overline{GR}$ of the GR within the sliding unit in real time:

$$\overline{Rt_{pre}} = \frac{\sum_{k=1}^{N} Rt_{pre_k}}{N};$$

$$\overline{DEN} = \frac{\sum_{k=1}^{N} DEN_k}{N};$$

$$\overline{GR} = \frac{\sum_{k=1}^{N} GR_k}{N};$$

calculating a sandstone hydrocarbon parameter P in a current sliding unit:

$$P = \frac{\overline{Rt_{pre}} * \overline{DEN}}{\overline{GR}}; \text{ and}$$

determining a position of a sliding window where the sandstone hydrocarbon parameter P is greater than a set sandstone hydrocarbon parameter threshold P1 as a sandstone member with the hydrocarbon potential.

5. A sand shale formation physical property evaluation system for deep oil and gas navigation comprising:

a data acquisition module, configured to acquire basic data of a target well location as well as basic data and a logging-while-drilling (LWD) resistivity (Rt) of an adjacent well, and divide the basic data of the target well location and the basic data of the adjacent well into lithological group data, porosity group data, drilling group data, and logging group data, wherein the lithological group data comprises: neutron logging (NEU), photoelectric factor (PEF), and gamma ray (GR); the porosity group data comprises: acoustic (AC), compensated neutron log (CNL), and density (DEN); the drilling group data comprises drilling rate, rotary speed, and bit pressure; and the logging group data comprises content of methane (C1), content of ethane (C2), mud density in all (MDIA) and formation pore pressure graduation (FPPG);

a significant parameter acquisition module, configured to calculate a first correlation value between each type of the basic data of the adjacent well and an LWD Rt curve of the adjacent well; and retain data with a maximum first correlation value in each of the lithological group data, the porosity group data, the drilling group data, and the logging group data, to acquire a lithological group significant parameter, a porosity group significant parameter, a drilling group significant parameter, and a logging group significant parameter;

an outlier elimination module, configured to eliminate, through an isolated forest algorithm, outliers of the lithological group significant parameter, the porosity group significant parameter, the drilling group significant parameter, and the logging group significant parameter to acquire standardized significant parameters;

a two-dimensional input feature map acquisition module, configured to select, based on the standardized significant parameters, the lithological group significant parameter for geological stratification to acquire a number of depth units between stratigraphic abrupt positions, and acquire a two-dimensional input feature map based on the number of the depth units, the standardized significant parameters, and the first correlation value;

wherein, a method for acquiring the depth units comprises:

setting ten data points $(x_{g1}, x_{g2} \ldots x_{g10})$ as one depth unit based on the lithological group data of the basic data of the target well location;

calculating an average value $\bar{x}_{lit}$ of the lithological group data of each depth unit:

$$\bar{x}_{lit} = \frac{x_{g1} + x_{g2} + \ldots + x_{g10}}{10};$$

wherein, g denotes a group number;

calculating a difference $d_u$ between average values $\bar{x}_{lit}$ of the lithological group data of adjacent depth units:

$$d_u = \bar{x}_{lit(u+1)} - \bar{x}_{lit(u)};$$

setting, when $d_u > 10$, a lower depth unit of corresponding adjacent depth units as a lithological abrupt position, and calculating a number $h_t$ of depth units between each two abrupt positions to represent a stratum thickness, wherein u denotes a serial number of the depth unit;

taking a product of the standardized significant parameters and the first correlation value as a weight parameter $Z_{cate} = S_{im1_{cate}} C_{cate}$, wherein cate denotes a category; and constructing the two-dimensional input feature map $Z_{cate} \times 4 \times h_t$, $Z_j \times 4 \times h_t$ by taking the number $h_t$ of the depth units as a stride;

an LWD Rt prediction module, configured to acquire, based on the two-dimensional input feature map, an LWD Rt prediction curve through a trained LWD Rt prediction model;

wherein, the LWD Rt prediction curve is acquired through the trained LWD Rt prediction model as follows:

forming the LWD Rt prediction model, comprising a t-channel image recognition network with 2t convolutional layers and 2t average pooling layers, wherein each channel comprises a first convolutional layer, a first average pooling layer, a second convolutional layer, and a second average pooling layer that are sequentially connected; each convolutional layer has a different size; an f-th channel comprises a $(4 \times f - 1) \times (4 \times f - 1)$ first convolutional layer, a $(4 \times f + 4) \times (4 \times f + 4)$ second convolutional layer, and 2×2 pooling layers; and all channels are connected together to one fully connected layer and one naive Bayesian decision maker;

denoting the first convolutional layer of a first channel, the first convolutional layer of a second channel, and the first convolutional layer of a third channel as a C1 layer, a C3 layer, and a C5 layer, respectively, wherein the C1 layer is configured to convolve an input image through 8 $h_t \times h_t$ convolution kernels; the C3 layer is configured to convolve the input image through 8 $3h_t \times 3h_t$ convolution kernels; and the C5 layer is configured to convolve the input image through 8 $5h_t \times 5h_t$ convolution kernels;

$$con_{p,q}^{l} = \sum_{m1=1}^{L} \sum_{m2=1}^{W} CON_{m1,m2}^{l-1} \times ker_{p,q}^{l} + b_{p,q}^{l};$$

wherein, $con_{p,q}^{l}$ denotes a convolution result at a position (p, q); l denotes a current layer number; CON denotes a matrix covered by convolution kernels; L and W denote a length and a width of the matrix covered by the convolution kernels, respectively; m1 and m2 respectively denote a serial number of a length and a serial number of a width of the convolution kernels, ranging from 1 to L; ker denotes a kernel function; and b denotes a corresponding bias term;

fitting the convolution result through a ReLU function to acquire a fitted convolution result;

performing upsampling pooling on the fitted convolution result:

$$con_{m3, m4}^{l} = \max(CON_{m1, m2}^{l-1});$$

wherein, $con_{m3, m4}^{l}$ denotes a two-dimensional matrix representation of a pooled convolution result; and m3, m4 denote a convolution result at a position (m3, m4);

converting the pooled convolution result into a tiled one-dimensional feature vector through a tiling layer;

integrating the tiled one-dimensional feature vector through the fully connected layer:

$$con_{key}^{l} = \sum_{r=1}^{R} con_{r}^{key-1} \cdot w_{r}^{l} + b_{r}^{l};$$

wherein, $con_{key}^{l}$ denotes a one-dimensional matrix representation of a feature after the integration through the fully connected layer; l denotes a current layer number; key denotes an index value of a one-dimensional matrix; R denotes a length of a feature vector in an (l−1)-th layer; w denotes a weight matrix; b denotes the corresponding bias term; and r denotes a serial number of a data point of the feature vector;

introducing the naive Bayesian decision maker into the fully connected layer; and taking the integrated tiled one-dimensional feature vector as the LWD Rt prediction curve; and a hydrocarbon potential area navigation module, configured to construct sliding units based on the depth units; traverse an initial stratigraphic framework model through the sliding units; calculate a hydrocarbon parameter in a window based on the LWD Rt prediction curve; and locate an area with a hydrocarbon potential based on the hydrocarbon parameter at each position, thereby acquiring a formation physical property evaluation result.

* * * * *